United States Patent [19]
Combes

[11] 4,077,604
[45] Mar. 7, 1978

[54] CYLINDRICAL GATE VALVE BODY

[75] Inventor: Marvin G. Combes, Castro Valley, Calif.

[73] Assignee: Grove Valve and Regulator Company, Oakland, Calif.

[21] Appl. No.: 737,853

[22] Filed: Nov. 1, 1976

[51] Int. Cl.² ............... F16K 27/04; F16K 27/10; F16K 3/00
[52] U.S. Cl. .................................. 251/329; 251/366
[58] Field of Search ................... 251/329, 366, 367

[56] References Cited

U.S. PATENT DOCUMENTS

| 2,347,676 | 5/1944 | Eplett | 251/366 X |
| 3,314,442 | 4/1967 | Voldin | 251/329 X |
| 3,442,286 | 5/1969 | Anderson et al. | 251/329 X |

FOREIGN PATENT DOCUMENTS

| 872,420 | 5/1953 | Germany | 251/366 |
| 896,584 | 11/1953 | Germany | 251/367 |

*Primary Examiner*—Arnold Rosenthal
*Attorney, Agent, or Firm*—Melvin R. Stidham

[57] ABSTRACT

A gate valve comprising a fabricated tubular cylindrical body with circular plate end closures. Back up rings are secured to the inner surface of the body to extend axially beyond the ends thereof and welds are placed between the closure plates and the annular ends of the body around the cylindrical surfaces of the back up rings to firmly unitize the tubular body and the end plates. One end closure plate has a slot therein to receive the valve gate closely therethrough for installation and removal thereof as required. The slot is covered by a generally rectangular bonnet plate.

3 Claims, 3 Drawing Figures

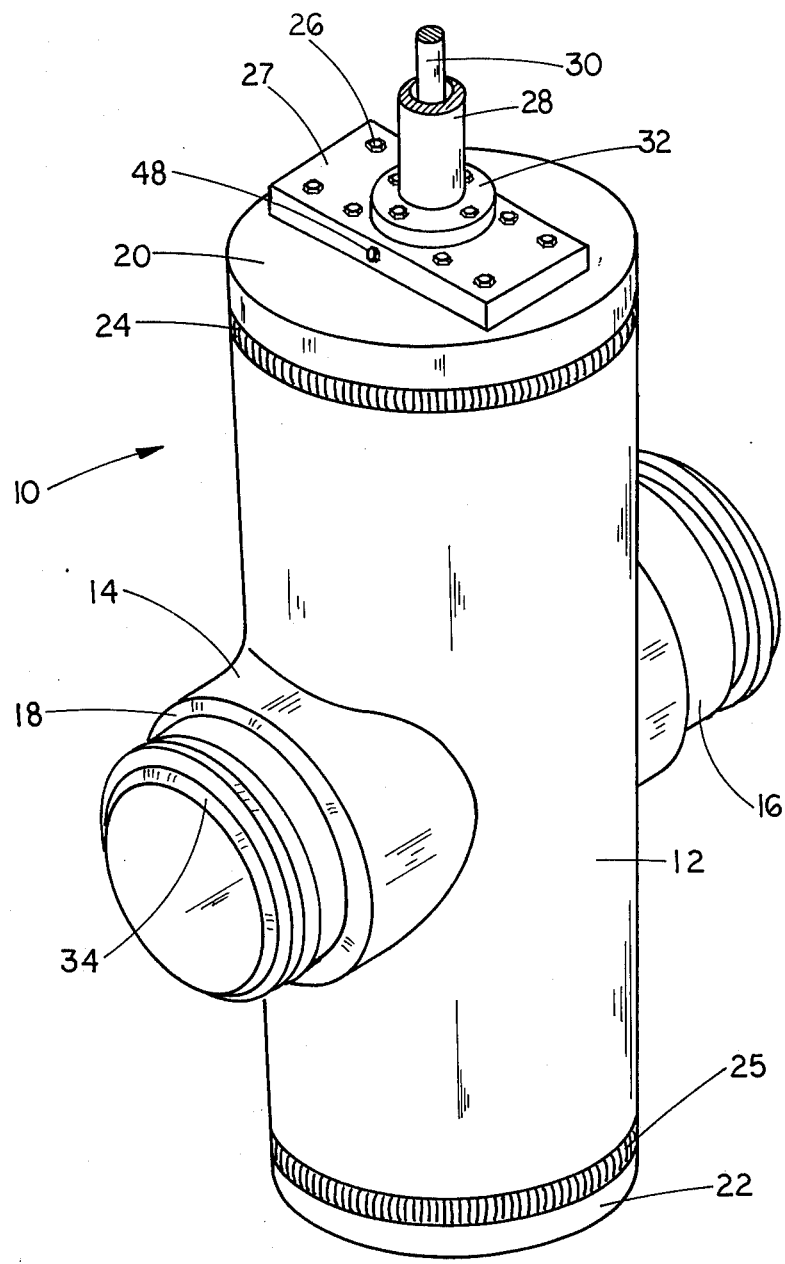
FIG -1-

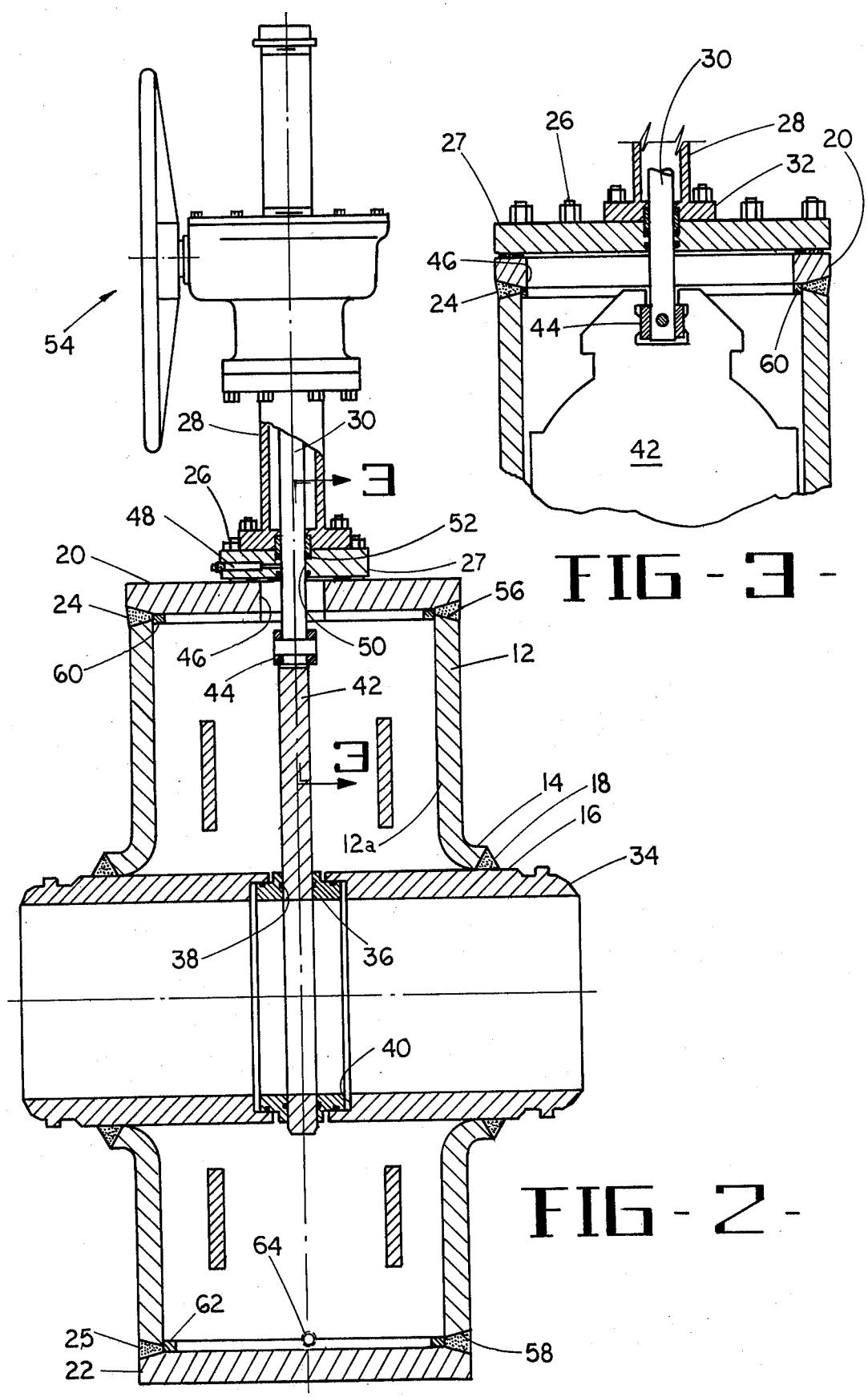

CYLINDRICAL GATE VALVE BODY

BACKGROUND OF THE INVENTION

Valve bodies and other pressure vessels are desirably of spherical or cylindrical configuration. Valves of such rounded configuration are commonly of cast construction, although some have been fabricated from plate steel or the like. Generally, the bonnet and in some cases, a bottom closure are integrally cast or pre-formed of rounded configuration to be welded or bolted to the valve body. This requires additional forming operations and, usually, difficult welding operations. In the case of a rounded bottom closure feet or legs are generally welded on to support the valve body erectly during manufacture and shipping.

OBJECTS OF THE INVENTION

It is an object of this invention to provide a cylindrical gate valve having rigid end closures, which is reliable in operation and relatively simple to manufacture.

It is a further object of this invention to provide a cylindrical gate valve with means to minimize stresses in the bonnet and bonnet bolts.

It is a further object of this invention to provide a cylindrical valve body havng a rigid body construction which provides access for installation and removal of a valve gate.

It is a further object of this invention to provide a cylindrical valve body which does not require feet or legs to support it during manufacture and shipping.

Other objects and advantages of this invention will become apparent from the description to follow when read in conjunction with the accompanying drawing.

BRIEF SUMMARY OF THE INVENTION

In carrying out this invention there is provided a cylindrical, tubular valve body, which is made of rolled steel plate or the like. Back up rings are secured around the inside of the valve body at the opposite ends thereof so that the cylindrical surfaces of the rings extend axially beyond the valve body extremities. Rigid closure plates are supported on the back up rings and welds are placed around the cylindrical surfaces of the rings in the space between the inner surfaces of the closure plates, and the annular end surfaces of the tubular valve body, to firmly unitize the rigid closure plate and the valve body. The flat bottom plate will support the valve during manufacture and shipping, without requiring feet. The top plate has a narrow slot across a diameter thereof which enables the installation of the valve seat rings and gate and, subsequently, their removal as required for servicing. A generally rectangular bonnet plate is bolted to the top closure. The bonnet plate is just wide enough to cover the width of the slot plus room for bolt holes, providing a relatively short path for drilling of lubrication passageways and the like to the valve stem. Because the bonnet is exposed to internal pressures only through the relatively narrow slot stresses are minimized to enable use of thinner material and fewer bonnet bolts.

BRIEF DESCRIPTION OF THE DRAWINGS

In the drawings:

FIG. 1 is an isometric view of a gate valve embodying features of this invention:

FIG. 2 is a vertical section of the gate valve of this invention; and

FIG. 3 is a partial section view taken along 3—3 of FIG. 3.

DESCRIPTION OF A PREFERRED EMBODIMENT

Referring now to FIg. 1 with greater particularity, the gate valve 10 of this invention comprises a cylindrical valve body 12 having outwardly swaged hub portions or retainers 14 in which are contained cylindrical hubs 16 welded at 18 to the hub retainers.

For simplicity of design and construction, the top and bottom closures 20 and 22 are planar circular members formed of relatively thick steel plate or the like secured to the ends of the valve body 12 by heavy weldments 24 and 25.

Secured to the top closure 20, as by means of bolts 26 is a bonnet plate 27 of rectangular configuration for purposes hereinafter to be described. A stem housing 28 is bolted to the top of the bonnet plate and the valve stem 30 is slidably accommodated in the bonnet plate 27 and the stem housing base 32.

Referring more particularly now to FIGS. 2 and 3, the hubs 16 have suitable means thereon for connection into a pipeline (not shown), as for example, the tapered ends 34 for a weld connection. At the inner ends of the hub 16, seat rings 36 with suitable seal means 38 are carried in recesses 40. A gate 42 is secured on the lower end of the stem 30 by suitable means 44 which enable a limited amount of movement in the direction of the pipeline axis, so as to accommodate to the seat ring 36.

The top closure plate 20 is provided with a rectangular or oblong slot 46 which is slightly longer than the width of the valve gate 42 and just wide enough to permit installation of the seat rings 36 and the valve gate 42 therethrough.

Because the slot is relatively narrow, the bonnet plate 26 can also be made relatively narrow and since it is exposed only to pressures through the slot 46 it may be of thinner material then would be required for a full circular bonnet and, of course, fewer bolts 26 are required. The relatively narrow width of the bonnet 27 also facilitates the drilling of lubrication passages or the like 48 from the outside of the bonnet to the bore 50 which slidably accommodates the stem 30. Suitable seal means 52 are also provided to render the structure fluid tight.

Mounted on the top of the stem housing 28 is a suitable valve actuating means such as the bevel gear operator 54 for raising and lowering the stem 30 to move the valve gate 42 between its open position (shown in FIG. 2) and its closed position with the imperforate portion thereof engaged by the seat rings 36.

Secured to the inner body surface 12a at the upper and lower ends thereof 56 and 58 are support or back up rings 60 and 62 which extend axially beyond said body ends to function as spacers for the closure plates 20 and 22, spacing them from the valve body ends 56 and 58, the back up rings 60 and 62 present a retention surface for welds 24 and 25 which are deposited around the cylindrical surface of such retainer rings in the space between the valve body ends 56 and 58 and the closure plates 20 and 22. This provides an extremely rigid structure, unifying the closure plates with the valve body 12.

A drain port 64 is provided at the bottom of the valve body 12 and, with the flat bottom closure 22, it enables virtually complete drainage thereof.

While this invention has been described in connection with a preferred embodiment thereof, it is obvious that modifications and changes therein may be made by those skilled in the art without departing from the spirit and scope of this invention as defined by the claims appended hereto.

What is claimed as invention is:

1. A gate valve comprising:
   a generally cylindrical tubular body:
   a flat, thick, generally circular closure plate having an outer diameter substantially equal to the outer diameter of said body welded to and around the top of said body to resist internal pressures;
   a narrow slot in said plate of dimensions adequate to receive closely a valve gate and stem therethrough; and
   a relatively narrow bonnet plate bolted to said closure plate to cover said slot, said bonnet plate having a through opening therein adapted to slidably receive said valve stem therethrough.

2. The gate valve defined by claim 1 including:
   a small passageway drilled from the side of said bonnet plate to said through opening.

3. The gate valve defined by claim 1 including:
   a ring secured to the inner surface of said body to extend therearound;
   the annular outer surface of said ring engaging the inner surface of said closure plate beyond the end of said body;
   said plate being welded to said body by a weld placed in and around the annular space formed between said plate, said body and the cylindrical surface of said ring.

* * * * *